United States Patent
Sultan et al.

(10) Patent No.: US 11,435,890 B2
(45) Date of Patent: *Sep. 6, 2022

(54) SYSTEMS AND METHODS FOR PRESENTATION OF CONTENT ITEMS RELATING TO A TOPIC

(71) Applicant: Google LLC, Mountain View, CA (US)

(72) Inventors: Ziad Sultan, Cambridge, MA (US); Vidhya Ramesh Bhat, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,728

(22) Filed: Jun. 28, 2021

(65) Prior Publication Data

US 2021/0326017 A1    Oct. 21, 2021

Related U.S. Application Data

(63) Continuation of application No. 16/889,155, filed on Jun. 1, 2020, now Pat. No. 11,048,402, which is a
(Continued)

(51) Int. Cl.
    *G06F 3/0485*       (2022.01)
    *G06F 16/9535*      (2019.01)
(Continued)

(52) U.S. Cl.
    CPC .......... *G06F 3/0485* (2013.01); *G06F 3/0482* (2013.01); *G06F 16/901* (2019.01); *G06F 16/908* (2019.01); *G06F 16/9535* (2019.01); *G06F 16/9538* (2019.01); *G06F 40/279* (2020.01); *G06F 3/04842* (2013.01)

(58) Field of Classification Search
    CPC ................................................... G06F 3/0485
    See application file for complete search history.

(56) References Cited

U.S. PATENT DOCUMENTS 8,813,133 B1    8/2014   DePrez et al.
9,274,696 B1    3/2016   Mierau et al.
(Continued)

OTHER PUBLICATIONS

Extended European Search Report for application No. 19173085.2, dated Aug. 7, 2019; 8 pages.
(Continued)

*Primary Examiner* — Roland J Casillas
(74) *Attorney, Agent, or Firm* — Dority & Manning, P.A.

(57) ABSTRACT

The present disclosure provides systems and methods that provide a lean-back, interactive experience that enables a user to browse and understand content items (e.g., news articles or reactions) that provide different perspectives around a topic (e.g., a news story). In particular, the systems and methods can provide context around a topic by assembling a wide-range of interesting content around a topic and seamlessly allowing users to scan through articles by surfacing unique information contained in them. The systems and methods of the present disclosure can read, understand, and organizes thousands of documents around a topic, hence allowing easy consumption of news.

20 Claims, 6 Drawing Sheets

Related U.S. Application Data continuation of application No. 16/403,863, filed on May 6, 2019, now Pat. No. 10,671,267.

(60) Provisional application No. 62/668,241, filed on May 7, 2018, provisional application No. 62/668,230, filed on May 7, 2018.

(51) Int. Cl.
*G06F 16/9538* (2019.01)
*G06F 3/0482* (2013.01)
*G06F 16/901* (2019.01)
*G06F 16/908* (2019.01)
*G06F 40/279* (2020.01)
*G06F 3/04842* (2022.01)

(56) References Cited

U.S. PATENT DOCUMENTS

| | | |
|---|---|---|
| 2003/0217328 A1 | 11/2003 | Agassi et al. |
| 2007/0239566 A1 | 10/2007 | Dunnahoo et al. |
| 2008/0082941 A1* | 4/2008 | Goldberg .............. G06F 3/0482 715/810 |
| 2011/0153396 A1* | 6/2011 | Marcuvitz .......... G06Q 30/0245 705/14.2 |
| 2014/0082666 A1 | 3/2014 | Bloch et al. |
| 2015/0134653 A1 | 5/2015 | Bayer et al. |
| 2016/0004779 A1 | 1/2016 | Sathish et al. |
| 2016/0140167 A1 | 5/2016 | Perez et al. |
| 2016/0334973 A1 | 11/2016 | Reckhow et al. |
| 2017/0017352 A1 | 1/2017 | Kanter et al. |
| 2017/0017369 A1* | 1/2017 | Kanter ................. G06F 3/0482 |
| 2017/0277790 A1 | 9/2017 | Alonso et al. |
| 2019/0179881 A1 | 6/2019 | Güngör et al. |

OTHER PUBLICATIONS

Chinese Search Report Corresponding to Application No. 2019103767554 dated May 28, 2022.

* cited by examiner

FIG. 4

SYSTEMS AND METHODS FOR PRESENTATION OF CONTENT ITEMS RELATING TO A TOPIC

PRIORITY CLAIM

The present application is a continuation of U.S. application Ser. No. 16/889,155, which is a continuation of U.S. application Ser. No. 16/403,863 having a filing date of May 6, 2019, which claims priority to both of U.S. Provisional Patent Application No. 62/668,241 and U.S. Provisional Patent Application No. 62/668,230. Each of U.S. application Ser. No. 16/889,155, U.S. application Ser. No. 16/403,863, U.S. Provisional Patent Application No. 62/668,241, and U.S. Provisional Patent Application No. 62/668,230 is hereby incorporated by reference in its entirety.

FIELD

The present disclosure relates generally to presentation of content items. More particularly, the present disclosure relates to interactive user interfaces that visually scroll cards associated with content items (e.g., news articles) relating to a topic (e.g., a news story).

BACKGROUND

Consuming information around a news story is difficult. For example, for a prominent news story, there may be thousands of news articles published by hundreds of publishers. Further, in addition to traditional textual news articles, today's media landscape further includes news content in different media formats such as videos, blogs, social media posts, etc. that are scattered across the web and not consolidated together in a single place.

Distilling the information from this large number of different sources is an extremely challenging task. In particular, gaining a nuanced understanding of a news story involves not just reading one article but having enough information regarding different perspectives around the news story to make a well-informed judgement about the issues underlying the news story.

Currently, there is no simple yet effective way for a user to get a sneak-peek into the content present in content items around a story that helps the user identify, understand, and read interesting documents. For example, in certain existing systems, a user is provided with only a list of unrelated news articles and the user must examine each different article to determine whether the article relates to a topic in which the user is interested in understanding. If the article does relate to the topic, the user is then required to load and read the whole article to understand its content.

Thus, it is difficult for users to understand all the dimensions of a story. A typical user is busy and does not have the time to scout the Internet for relevant information to be well informed about a news story.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to provide an informational display. The method includes selecting, by one or more computing devices, a plurality of content items that relate to a topic. The method includes generating, by the one or more computing devices, one or more content descriptors for each of the plurality of content items. The method includes providing for display, by the one or more computing devices, a user interface that cycles through a plurality of cards respectively associated with the plurality of content items. For each of the plurality of cards, the user interface presents at least one of the one or more content descriptors generated for the content item that corresponds to such card.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Generally, the present disclosure is directed to systems and methods that provide a lean-back, interactive experience that enables a user to browse and understand content items (e.g., news articles or reactions) that provide different perspectives around a topic (e.g., a news story). In particular, the systems and methods can provide context around a topic by assembling a wide-range of interesting content around a topic and seamlessly allowing users to scan through articles by surfacing unique information contained in them. The systems and methods of the present disclosure can read, understand, and organize thousands of documents around a topic, hence allowing easy consumption of news.

In particular, in some implementations, the systems and methods of the present disclosure can generate and provide for display an interactive user interface (which can be referred to as a "newscast") that displays (e.g., sequentially in an auto-play fashion) a number of individual windows, frames, cells, or other discrete display elements, referred to herein as "cards", where each card corresponds to a document, video, "audio clip", social media post, or any other type of content item related to a topic. Clicking on, tapping, or otherwise selecting one of the cards can take the user to the full version of the corresponding document, video, social media post or other content item. Alternatively or additionally, one or more of the cards can provide the user with an option of visiting a larger landing page that contains more complete and multi-faceted information and coverage about the topic which allows a deep dive into the topic.

In some implementations, the "display" may be an audio stream, and the "cards" may be individual audio clips with interstitial demarcations such as tones, phrases (e.g., "next clip"), or a combination of visual and audio "cards". In these implementations, a user may select a card with a spoken instruction (e.g., "play the second one", "play the one from Bloomer News Network", etc.). In some implementations, the user interface can include an icon or other control widget that enables the user to initiate an audio-based implementation or hybrid audio/video implementation of the user interface. Additionally or alternatively, in some implementations, the user device itself will limit the interface to audio, such as in the case of so-called assistant-enabled devices or "smart speakers," or in situations in which context indicates that audio-focused interfaces are preferred, such as in an automotive environment.

More particularly, a computing system can select a number of content items that relate to a topic for inclusion in a newscast about the topic. For example, the computing system can identify a cluster of content items around a topic and can select some of the content items for inclusion in the newscast. The content items can include individual articles, blogs, textual comments, videos, audio clips, and/or other items of content that at least inferentially relate to the topic.

In one example, newscasts around topics can be a feature of a content aggregation application (e.g., news application) or platform and, in one example, the computing system can generate a newscast for any topic where the corresponding cluster of content items exceeds a certain number. Once generated, for example, the newscast can be provided in a content feed within the content aggregation application. Thus, a newscast can be triggered based on how significant a topic is and how much information is available around the topic.

In another example, if the user has performed a search for a particular topic, in response, the computing system can identify and select content items related to such topic and generate a newscast for presentation to the user. Thus, the newscast can be provided as a search result. In yet further examples, newscasts can be driven based on personalization for a user (e.g., if the user has a user profile). In another example, a newscast for a given topic can be generated in response to a user requesting additional information on the topic while, for example, browsing a first content item regarding the topic. Thus, the computing system can enable the user to transition from one content item about a topic to other content items on the same topic.

Thus, in some implementations, the computing system can perform a backend algorithm that identifies and clusters content items related to a topic from a wide range of sources of content items (e.g., publisher websites, blogs, social media platforms, video platforms, and/or the like). The content item selection algorithm can ensure that there is sufficient diversity in both actual content (e.g., perspective) and also type of content (e.g., video versus textual social media post), which prevents redundant information being shown to a user while also allowing the user to explore various differing perspectives around the topic. The algorithm can also identify and cluster other useful information that is necessary to provide more context around the story such as social media posts from key people in the story and videos that are relevant to the story. Thus, by selecting a diverse array of content types and perspectives, the computing system can objectively curate content items related to a core theme or topic.

The computing system can generate a card for each selected content item. For example, the card for a content item can include a title of the content item, a graphic associated with the content item, and/or other information such as snippets from the content item, as will be described further below.

For example, the graphic can include a still picture extracted from the content item. In some implementations, the graphic can be presented as dynamic imagery. As one example, the still picture can be moved (e.g., translated side to side and/or increased or decreased in size (e.g., zoomed)) during presentation on the card. As another example, the content item can be or include a movie and at least a portion of the movie can be played back when the card for such content item is displayed. In an at least partial audio embodiment, the card can include a selected audio sample that is associated with the content item. Presentation of the card can include playback of the selected audio sample. Thus, in some implementations, the card for each content item can include large and rich visuals (and/or audio) which serve to catch the user's interest while also conveying the actual content itself.

The computing system can present the cards in the newscast format described herein. In particular, according to one aspect of the present disclosure, a newscast can present a plurality of cards in an interactive slide-show-like format that lets users browse content items that relate to a topic. As examples, the user interface can automatically scroll through the cards and/or the user can swipe, audibly instruct, or otherwise navigate through the array of cards.

In particular, in some implementations, users can interact with the newscast by swiping through the cards to see a wide range of content around the topic. Users can also be provided with a fast forward button that makes scanning through the cards quick and easy. Users can tap on these buttons to navigate back and forth between the cards on newscasts and to make the snippets on the cards load quickly. This helps users browse articles from multiple publishers, see videos, social media posts and other media along with the articles and get a flavor of the different perspectives around the story.

In some implementations, each card presented in the newscast can include one or more content descriptors that describe the corresponding content item. In particular, in some instances, the content descriptors include interesting pre-selection information that piques the user's interest and hence enhances the experience of browsing through content to find interesting material. In one example, the content descriptors can include snippets and/or quotes generated or extracted from the content items in the newscast that help the user get a glimpse of the content within each respective content item.

Thus, in addition to assembling content, newscasts also enable users to identify and read interesting articles by surfacing snippets or key facts from the content item on the cards. These snippets could be interesting sentences from the content item or quotes from key people in the story extracted from the content item. Thus, in some instances, the snippet can be a portion extracted from a body of the content item, for example, rather than a title, subtitle, or other heading associated with the content item. The snippets can be displayed along with the publisher titles and timestamp on content items in the newscast. Thus, in some implementations, each card included in the newscast can contain an extracted snippet along with publisher title on the card and clicking on the card would take users to the content item.

In some implementations, snippets are extracted or otherwise generated using an algorithm that identifies salient sentences to help users get a flavor of the content in the content item. The algorithm ensures that similar sentences are not extracted from the content items in a newscast and eliminates redundancy in information. The snippet can include easily digestible information that, for example, summarizes the content item.

Further, in some implementations, quotes can be extracted using another algorithm that identifies a quote made by a person in the document. Using semantic understanding of text, the algorithm can identify who made the quote and how relevant the quote is to the story/topic. For content items that contain a quote, the extracted quote along with who made the quote can be displayed as the snippet on the newscast card.

An additional example of a content descriptor includes a label or other identifier that displays journalistic styles of the article (e.g., Opinion, Reporting, Satire, Live Blog, etc.). As another example, a content descriptor can describe a level of opinion contained within the content item (e.g., from 1 to 5). As another example, a content descriptor can describe a level of fact (or contrarily a level of misinformation) contained within the content item. As a still further example, a user may select items determined to be similar to a particular content item or publisher or different than a particular content item or publisher, etc. in order to be provided with additional content items that are determined to be from a similar perspective or a different perspective from a specific content item, respectively.

Surfacing content descriptors (e.g., as described above) on the newscast cards empowers users to understand the content in documents better and make a well-informed decision around finding the right article to read. This fuels the publisher ecosystem since users can easily scan through a variety of publishers and different styles of reporting, exposing them to different perspectives.

Thus, for any topic (e.g., news story), newscasts can organize a number of content items and allow a user to interact with such content items without overwhelming the user. This enables the user to browse through some of the interesting articles and other content around the story seamlessly and makes it easy for users to understand what the document is and why they should read it. This provides a huge value in user experience since users can browse interesting content from across the web and understand the story better.

In particular, the user interface gives users a sneak peek into some of the interesting documents around a story by assembling a wide range of documents, social media posts and videos. In addition, the cards can feature extracted snippets and quotes from the content items that help users get a glimpse of the content within these articles. This helps users browse articles from multiple publishers, see videos, social media posts, and other media along with the content items and gain an understanding of the different perspectives around the story.

Although the newscast user interface is described herein primarily with respect to news content related to a news story, the user interface can be used to enable users to browse content items around any different type of topic (e.g., Travel, Hiking, Technology, etc.). The user interface can also be used to explore different content items (e.g., not uniformly related to a single unifying topic) from a particular publisher.

The systems and methods of the present disclosure provide a number of technical effects and benefits. In one example, the present disclosure provides a way for users to easily scan through interesting content around a topic and, similarly, to easily identify and content that the user wishes to consume in further detail. By providing such a newscast user interface, the user is able to more quickly comprehend the true nature of each content item and ascertain whether she is interested in reading the content item in full. In such fashion, the user is able to avoid loading and reading content items in which she is not interested in reading, thereby conserving processing, memory, and network resources of the computing system (whether server device, client device or both). Likewise, by selecting a diverse array of content items for inclusion in the newscast, the systems and methods of the present disclosure are able to provide informational displays with improved diversity, structure, and/or other features which take into account the actual content of the documents themselves. In such fashion, the user is able to easily ascertain a more diverse representation of the different stances included in the content items. Therefore, the user can avoid reading/viewing content items which feature redundant opinions, thereby again conserving processing, memory, and network resources of the computing system.

In some cases, systems of the type disclosed herein may learn through one or more various machine learning techniques (e.g., by training a neural network or other machine-learned model) a balance of the types of content items, perspectives, sources, and/or other attributes that are preferred, such as based on different types of content, different user populations, different contexts such as timing and location, etc. For example, data descriptive of actions taken by one or more users (e.g., "clicks," "likes," or similar) with respect to the user interface in various contextual scenarios can be stored and used as training data to train (e.g., via supervised training techniques) one or more machine-learned models to, after training, generate predictions which assist in providing content in the user interface which meets the one or more users respective preferences. In such a way, system performance is improved with reduced manual intervention, providing fewer user searches and further conserving processing, memory, and network resources of the computing system (whether server device, client device or both).

With reference now to the Figures, example embodiments of the present disclosure will be discussed in further detail.

Example User Interfaces

Figure 1A:
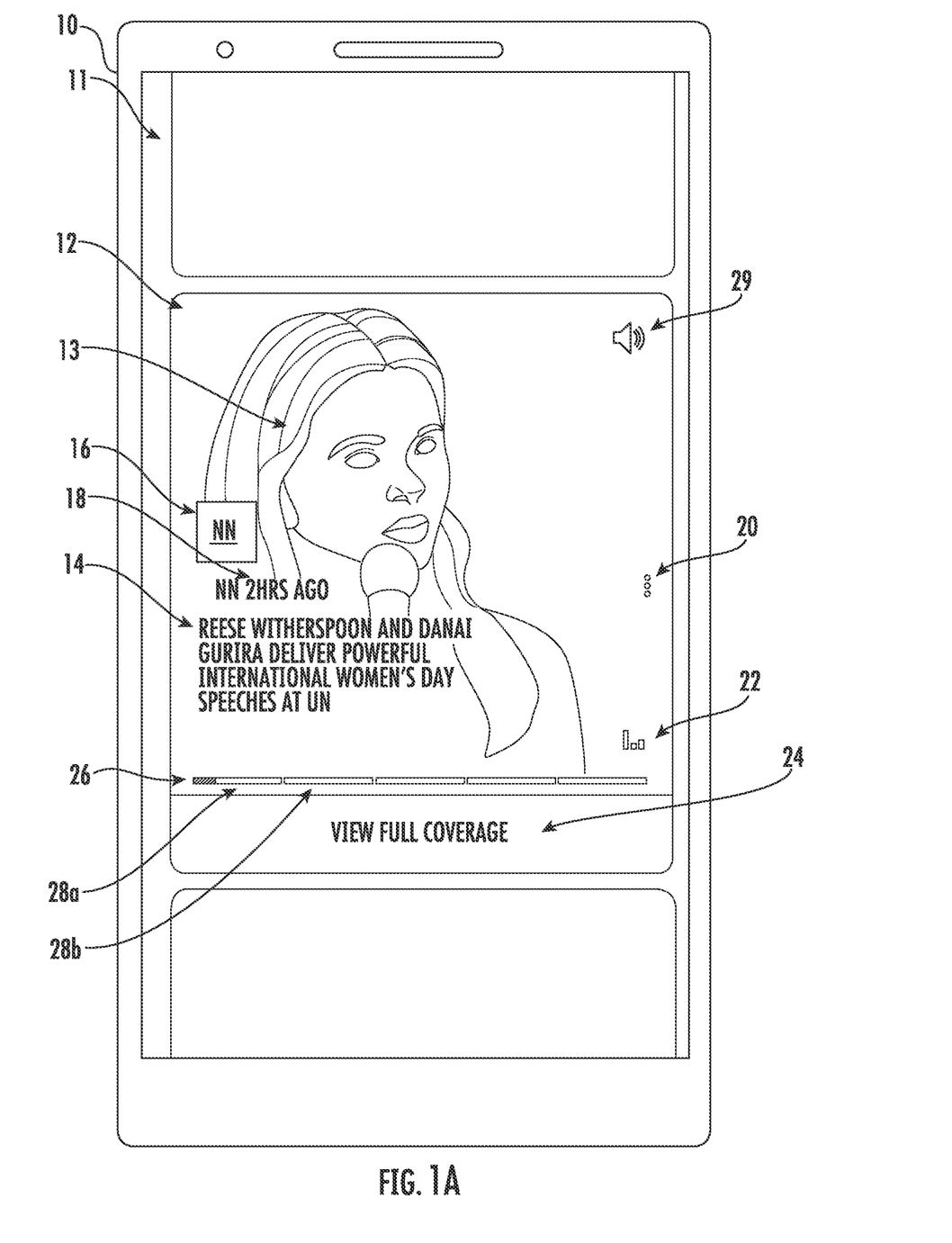
FIGS. 1A-C depict graphical diagrams of example user interfaces according to example embodiments of the present disclosure.
Figure 1B:
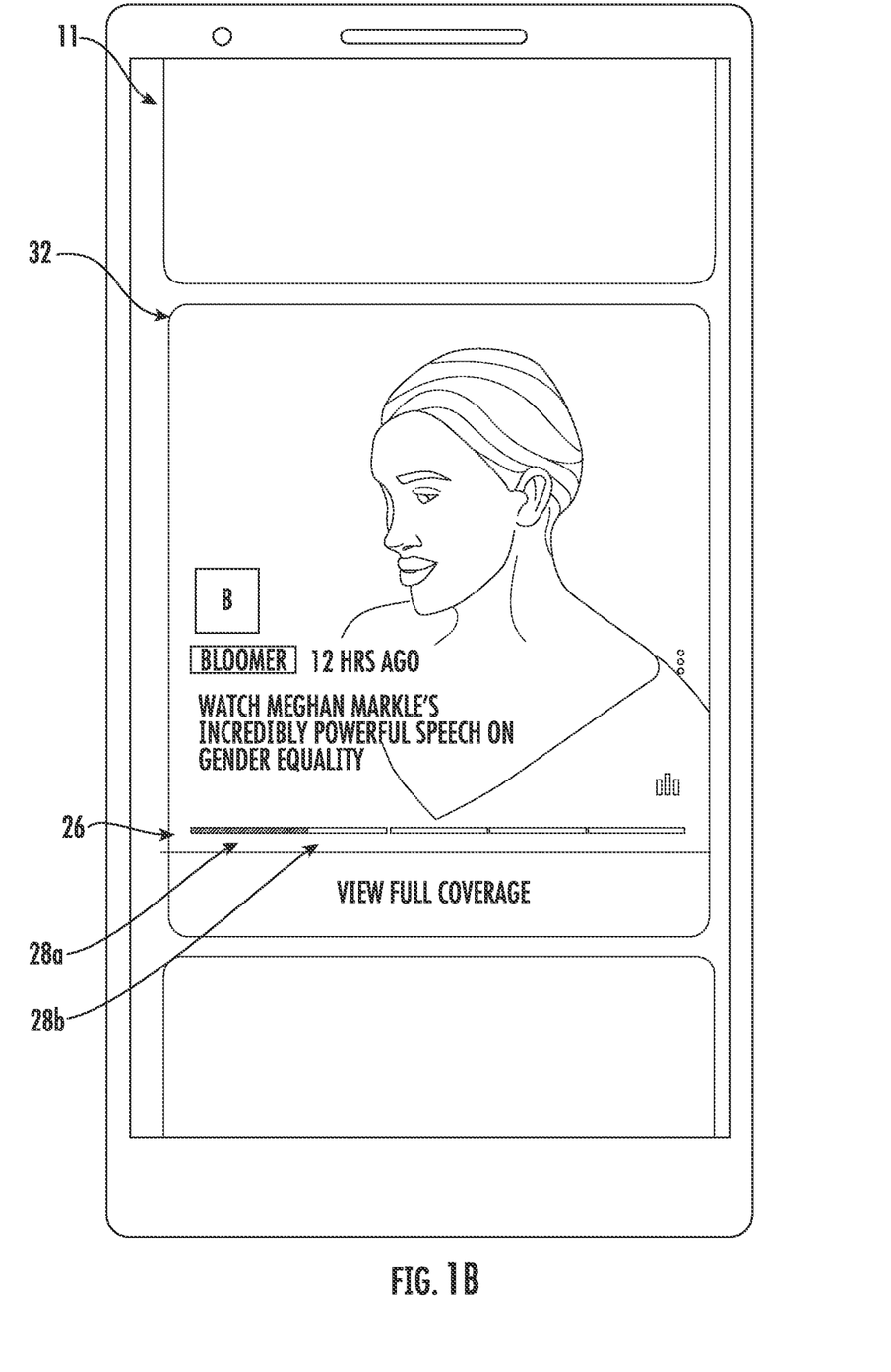
Figure 1C:
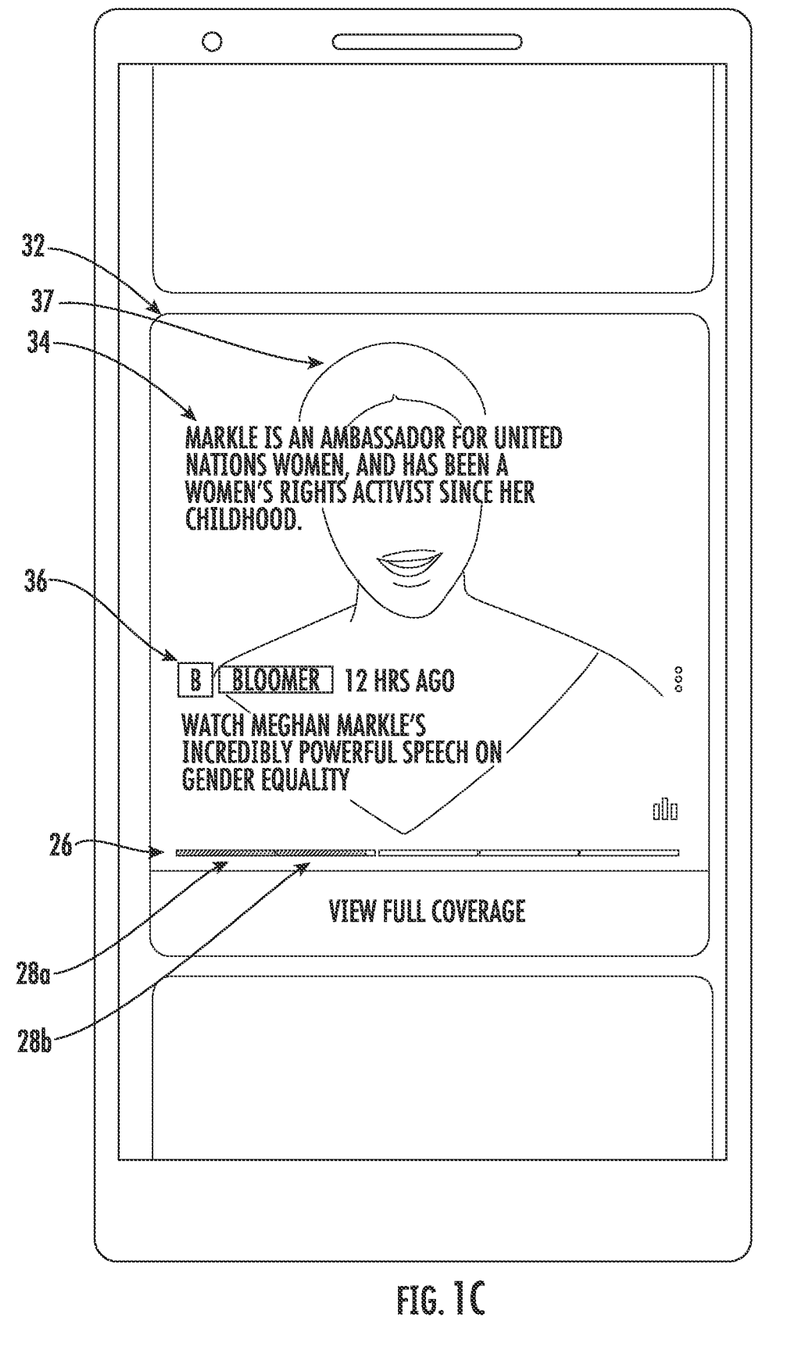

FIGS. 1A-C depict graphical diagrams of example user interfaces according to example embodiments of the present disclosure. The example user interfaces shown in FIGS. 1A-C are provided as examples only. Many other and different user interfaces can be used in addition or alternatively to the example user interfaces of FIGS. 1A-C.

Referring first to FIG. 1A, a device 10 is displaying a user interface 11 that includes a card 12. For example, the card 12 can be the first card in a newscast that is displayed as part of a content feed (e.g., the cards above and below 12 can be part of the feed).

The card 12 corresponds to a news article discussing a speech given a particular event. The card 12 includes a video 13 that has been extracted from the news article and is being played back in the card 12. If the user taps or otherwise selects the card 12, the user will be taken to the full news article.

The card 12 also includes a title 14 of the news article. The card 12 also includes an icon 16 that indicates the publisher of the news article (also shown in text below) and a timestamp 18 that indicates the age of the news article. A button 20 allows the user to receive additional selectable options about the card 12. The card 12 can also include additional content descriptors such as, for example, a label that marks that the corresponding news article is an Opinion article or a label that indicates that the video 13 is streaming live.

Because the card 12 includes playback of the video 13, the card 12 can also include an equalizer button 22. If the user selects the equalizer button 22, the user can be provided with controls that allow the user to control an audio level (e.g., mute or unmute the audio) associated with playback of the video 13. Although the example card 12 includes a video 13, it could alternatively include a still picture or other graphic.

In some implementations, the card 12 can further include a speaker icon 29 or other control widget that enables the user to initiate an audio-based implementation or hybrid audio/video implementation of the card 12. Additionally or alternatively, in some implementations, the device 10 itself will limit the interface to audio, such as in the case of so-called assistant-enabled devices or "smart speakers," or in situations in which context indicates that audio-focused interfaces are preferred, such as in an automotive environment.

The card 12 also includes a footer 24 that includes a link that, if selected, will take the user to a larger landing page that provides more information about the event.

The card 12 also includes a progress bar 26. The progress bar 26 indicates the progress through the newscast (e.g., through the plurality of cards that make up the newscast). In some implementations, such as the illustrated implementation, the progress bar 26 includes a plurality of disconnected segments (e.g., segments 28a and 28b). In some implementations, each disconnected segment corresponds to one of the cards. For example, segment 28a corresponds to the card 12.

The user interface 11 can progressively fill the segment 28a while the card 12 is displayed (e.g., during a presentation period associated with the card 12). Once the presentation period associated with the card 12 expires, the user interface can replace card 12 with a new card (e.g., card 32 as shown in FIG. 1B. Thus, the user interface 11 can auto play through the cards.

The presentation period associated with each can be a predefined amount of time (e.g., five seconds). The presentation periods can be consecutive and non-overlapping. Card 12 can be replaced with a new card in any number of different fashions, including, for example, horizontal sliding/wiping of the card, flipping of the card, etc.

Referring now to FIG. 1B, following expiration of the presentation period associated with card 12, the user interface 11 now shows a second card 32. The second card 32 is similar to card 12 but corresponds to a different content item relating to the same topic.

As can be seen at the progress bar 26, the segment 28a that corresponds to card 12 has completely filled and the segment 28b that corresponds to the second card 32 is in the progress of being filled.

According to an aspect of the present disclosure, during presentation of a card (e.g., card 32) one or more snippets can also be displayed on the card. Snippets can include sentences or quotes extracted from the content item and/or can include other information about or from the content item.

In some implementations, for example as illustrated in FIGS. 1B and 1C, the snippet can be added mid-way through presentation of the card. Thus, as an example, FIG. 1B shows an initial portion of a presentation period associated with the card 32 where the snippet is not present, while FIG. 1C shows a secondary portion of the presentation period where a snippet 34 has been added. Likewise, it can be seen that segment 28b of progress bar 26 is more full in FIG. 1C relative to FIG. 1B.

In some implementations, the snippet 34 and/or other features on the card can be presented with a typewriter effect in which textual characters included in the snippet are sequentially added on the card over a period of time. In some implementations, when the snippet 34 is presented, various other features of the card (e.g., the icon 36 that indicates the publisher) can be reduced in size to make room for the snippet 34.

In some implementations, the graphic 37 (e.g., video, still image, or other graphic) can be darkened or otherwise de-emphasized when the snippet 34 appears. This helps to make newscasts less overwhelming.

Example Computing Systems

Figure 2:
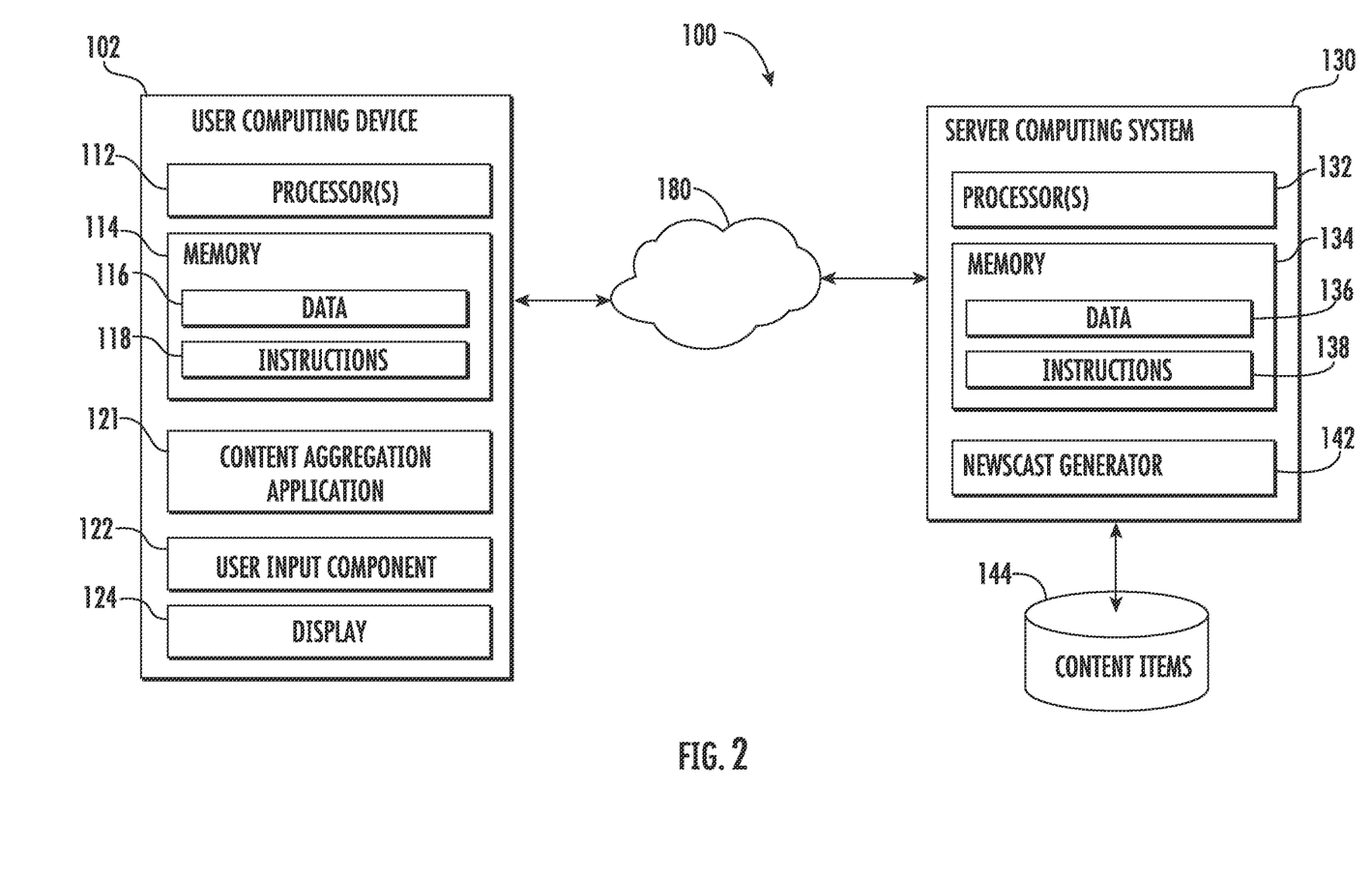
FIG. 2 depicts a block diagram of an example computing system according to example embodiments of the present disclosure.

FIG. 2 depicts a block diagram of an example computing system 100 that generates and provides newscasts according to example embodiments of the present disclosure. The system 100 includes a user computing device 102 and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a smart speaker, a computing device that is able to be worn, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can include a content aggregation application 121. For example, the content aggregation application 121 can communicate with the server computing system 130 over network 180 to receive and display content items to a user (e.g., in the form of a content feed). In some implementations, the content aggregation application 121 can receive a newscast generated by the server computing system (e.g., by a newscast generator 142) and can display the newscast within a user interface of the content aggregation application (e.g., as an entry in a content feed).

In other implementations, the user computing device 102 does not necessarily include a dedicated content aggregation application 121, but may instead include a browser application (not shown). The browser application can communicate with the server computing system 130 over network 180 to receive and display content items to a user (e.g., in the form of a content feed). In some implementations, the content aggregation application 121 can receive a newscast generated by the server computing system (e.g., by the newscast generator 142) and can display the newscast within a browser window of the browser application (e.g., as an entry in a content feed). The browser application can in some examples be a mobile browser.

Figure 3:
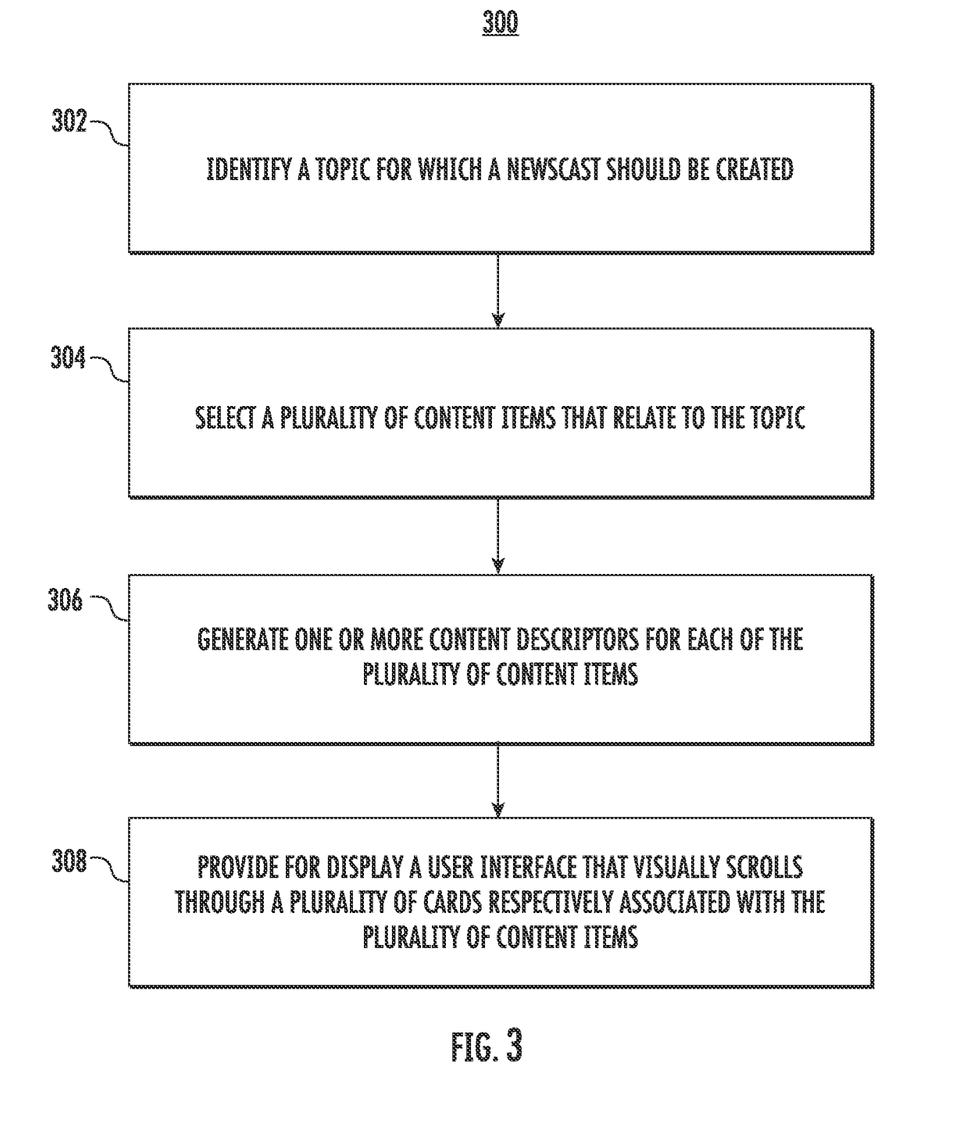
FIG. 3 depicts a flow chart diagram of an example method to provide an informational display according to example embodiments of the present disclosure.
Figure 4:
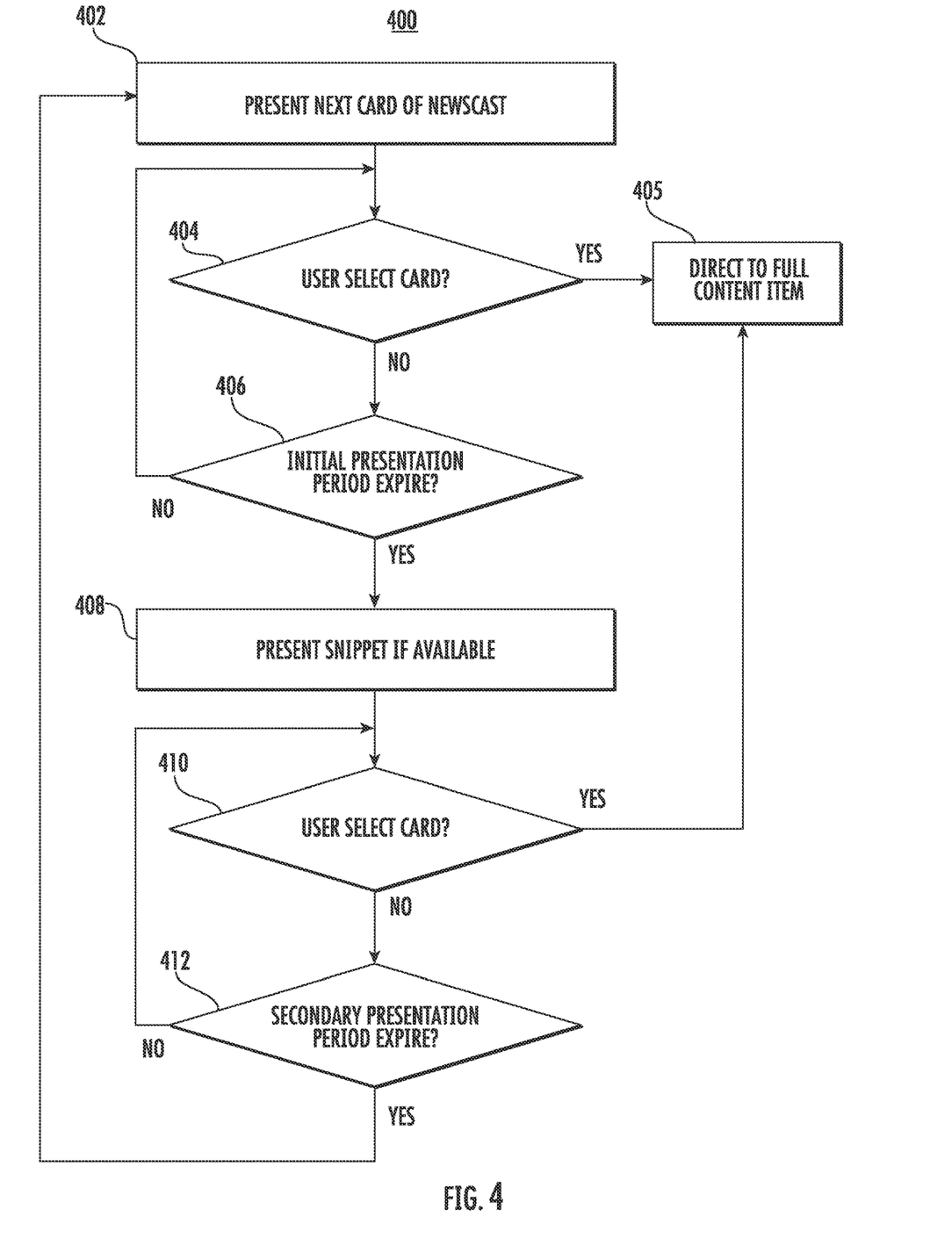
FIG. 4 depicts a flow chart diagram of an example method to provide an informational display according to example embodiments of the present disclosure.

As examples, the content aggregation application 121 and/or the browser application can perform some or all of method 300 of FIG. 3 and/or method 400 of FIG. 4.

The user computing device 102 can also include one or more user input components 122 that receive user input. For example, the user input component(s) 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a mouse, a traditional keyboard, or other means by which a user can provide user input.

The user computing device 102 can also include a display 124. For example, the display 124 can be a touch-sensitive display screen. Thus, in some instances, the display can be a user input component 122. As examples, the display 124 can be a liquid crystal display (LCD) or organic light-emitting diode (OLED) part of a touch screen, can be a non-touchscreen direct view display component such as a cathode ray tube (CRT), light-emitting diode (LED), LCD, or OLED. The display 124 can also be a projector instead of a direct view display.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

In some implementations, the server computing system 130 can include a newscast generator 142. The newscast generator 142 can generate a newscast or other informational display that provides cards associated with content items. For example, the newscast generator 142 can access one or more content item databases 144 that contain content items to generate the newscast. For example, the content items database(s) 144 can include content items that are published (e.g., on the web) by various publishers. For example, the content items can be accessed from the publishers' web domains or the content items can be submitted by the publishers to a central database associated with the server computing system 130. The content item databases 144 can include data associated with news websites, blogs, social media platforms, and/or other sources of content items. The content item databases 144 can be one database or multiple databases. Multiple databases can be co-located or can be physically distributed.

As examples, the newscast generator 142 can perform some or all of method 300 of FIG. 3 and/or method 400 of FIG. 4. However, in one example, the newscast generator 142 performs method 300 of FIG. 3 while the content aggregation application 121 or browser application performs method 400 of FIG. 4.

Although the newscast generator 142 is shown as located at the server computing system 130, in other implementations, the newscast generator 142 can be included in a content aggregation application (e.g., news application) stored on and executed by the user computing device 102.

Each of the content aggregation application 121 and the newscast generator 142 includes computer logic utilized to provide desired functionality. Each of the content aggregation application 121 and the newscast generator 142 can be implemented in hardware, firmware, and/or software controlling a general purpose processor. For example, in some implementations, each of the content aggregation application 121 and the newscast generator 142 includes program files stored on a storage device, loaded into a memory and executed by one or more processors. In other implementations, each of the content aggregation application 121 and the newscast generator 142 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example Methods

FIG. 3 depicts a flow chart diagram of an example method 300 to provide an informational display according to example embodiments of the present disclosure.

At 302, a computing system can identify a topic for which a newscast should be created. In one example, the computing system can generate a newscast for any topic where a corresponding cluster of content items exceeds a certain number (e.g., 50). By generating newscasts for topics with a large number of associated content items, the computing system draws the user's attention to important stories. As another example rule, in some implementations, newscasts will not be generated/triggered for topics that have less than a certain number (e.g., 7) of unique content items in the cluster.

Thus, the computing system may rely upon or otherwise leverage an algorithm that clusters content items according to topics. For example, the system may generate clusters through keyword matching or other natural language processing, clustering algorithms (e.g., k-nearest neighbors), use of knowledge graphs, and/or other techniques for associating content items with different topics.

In another example, if the user has performed a search for a particular topic, in response, the computing system can determine at 302 that a newscast should be generated for such topic.

At 304, the computing system can select a plurality of content items that relate to the topic. Thus, given a cluster of content items around a topic, the computing system can perform at 304 a content item selection algorithm to select certain of such content items for inclusion in the newscast.

In some implementations, the content item selection algorithm performed at 304 can ensure that there is sufficient diversity in both actual content (e.g., perspective) and also type of content (e.g., video versus textual social media post), which prevents redundant information being shown to a user while also allowing the user to explore various differing perspectives around the topic. The algorithm can also identify and cluster other useful information that is necessary to provide more context around the story such as social media posts from key people in the story and videos that are relevant to the story. Thus, by selecting a diverse array of content types and perspectives, the computing system can objectively curate content items related to a core theme or topic.

In particular, content items included in the newscasts should be from a diverse range of publishers so that users are exposed to different perspectives. In some implementations, the content selection algorithm performed at 304 can rank content items and pick a set of diverse content items as candidates for the newscasts. Diversity can be based on the following axes: salient terms; persons discussed; opinion (or the lack thereof); news diversity; similar audience based diversity; and/or other characteristics.

In some implementations, in addition to the diversity objectives described above, the content item selection algorithm can implement or enforce a number of rules that assist in selecting content items and generating the associated newscast.

As one example, each newscast generated by the system can include a certain number (e.g., 3, 5, 7, etc.) of content items and corresponding cards. The cards can include a video, an image, a document, a social media post, and/or other artifacts.

As another example, the lead (i.e., first) card can always be a document or a video that generally summarizes the topic or otherwise helps the user understand what the topic is about.

In some implementations, social media posts that are highly relevant to the topic are surfaced in newscasts. These posts are typically from authoritative voices that are involved in the story and are likely to be embedded in three or more documents in the cluster, which is a sign of importance. Thus, the fact that a tweet is embedded in other content items in the topic cluster is a strong signal that it should be included in the newscast.

In some implementations, the computing system can use the content item selection/ranking algorithms described above to first identify a certain number of textual documents and then subsequently make calls to fetch videos, quotes, and/or social media posts along with the selected textual documents.

At 306, the computing system can generate one or more content descriptors for each of the plurality of content items. As examples, the content descriptors can include a snippet, where the snippet is a textual summary of the content item, one or more sentences extracted from the content item, and/or a quote extracted from the content item. As another example, the content descriptors can include an opinion level descriptor that describes a level of opinion contained in such content item. Other content descriptors can be used as well including various labels or tags that classify certain aspects of the corresponding content item.

More particularly, some or all the cards included in a newscast will have a snippet generated or extracted and displayed on the card. The snippets on the cards can be non-redundant and can offer unique value to users swiping through the cards on newscasts.

Cards that have snippets displayed on them can include some or all of the following items: Image (e.g., document+snippet card); Snippet overlay (e.g., document+snippet card); Kicker indicating content type such as LIVE or OPINION (e.g., document+snippet card); Extracted quote on a white background (e.g., document+quote card); Identification of the person who made the quote (e.g., document+quote card); Publisher title (e.g., document+snippet card, document+quote card); Publisher logo (e.g., document+snippet card, document+quote card); Published timestamp (e.g., document+snippet card, document+quote card); Overflow menu for feedback (e.g., document+snippet card, document+quote card).

In some implementations, all video cards on newscasts will have a user interface indicator (e.g., equalizer or sound modulation animated icon) on them. Videos can play inline if the video if possible. Certain videos may not contain snippet overlays to avoid visual noise.

In some implementations, a kicker or tag can be presented on cards for documents or videos that are LIVE and/or can be presented on OPINION pieces to help users distinguish these from factual reporting.

In some implementations, quotes from key people are extracted from content items included in the newscast and are displayed on the corresponding card. In some implementations, quotes are permitted only on the cards at certain positions (e.g., position 2 or 3). In some implementations, a newscast is prohibited to contain more than two cards with quotes on them.

In some implementations, the extracted quotes can adhere to some or all the following guidelines: Quotes should be from an authoritative people that have knowledge graph entities associated with them. For example: ["quote" by spectator] or ["quote" by board of director] should be avoided, while ["quote" by Donald Trump] or ["quote" by Chadwick Boseman] are preferred so users have better context. In another example, titles of movies, songs or books should not be displayed as quotes. For example: ["Look what you made me do", Taylor Swift] should not be considered as a quote since it's the name of a song. As yet another example, quotes should contain four or more words, because quotes that are less than words long provide very little value/context to the story. For example: ["I saw that", J. K. Rowling] adds very little context to the story. Quotes must be correctly attributed to the person who made the quote. The quote should also be attributed to the document it is extracted from. Quotes should be complete sentences and should end with a period. Snippets should be diverse and they should be de-duplicated. Thus, generating one or more content descriptors for each of the plurality of content items can include de-duplicating the one or more content descriptors for the plurality of content items.

At 308, the computing system can provide for display a user interface that visually scrolls through the plurality of cards that are respectively associated with the plurality of content items.

In particular, after generating the one or more content descriptors for the plurality of content items, the computing system can mix them together using a packing algorithm that ensures the appropriate ordering. As one example, in some implementations, newscasts should not lead with quotes or social media posts since users should understand the story first before getting supplementary/contextual information. Thus, in some implementations, the lead content item should always be factual reporting.

As another example, in some implementations, newscasts should not contain more than two quotes and the quotes (if any) should be placed among cards two through four. As another example, in some implementations, the newscast should contain not more than one social media post and the social media post can be placed among cards two through four. As yet another example, in some implementations, opinions should be ranked between cards four and seven and should be diverse.

In one example, a server computing system can generate the newscast as described in method 300 and can provide the newscast to a user computing device for display by the user computing device.

FIG. 4 depicts a flow chart diagram of an example method 400 to provide an informational display according to example embodiments of the present disclosure.

At 402, a computing system presents the next card of a newscast. For example, at the first instance of 402, the next card can be the first card. In some instances, presenting a card can include playback of a video associated with the card.

At 404, the computing system determines if the user has selected the card. If the user has selected the card, then method 400 proceeds to 405 and the computing system directs the user to the full content item.

However, if the user has not selected the card, then method 400 proceeds to 406 and the computing system determines whether an initial presentation period associated with the currently displayed card has expired. If the initial presentation period has not expired, then method 400 returns to 404.

However, if the initial presentation period has expired, the method 400 proceeds to 408 and the computing system presents the snippet associated with the currently displayed card, if one is available. Snippets are not required to be generated for each and every card. Additionally or alternatively to presentation of the snippet at 408, other content descriptors can be presented. After 408, method 400 proceeds to 410.

At 410, the computing system determines if the user has selected the card. If the user has selected the card, then method 400 proceeds to 405 and the computing system directs the user to the full content item.

However, if the user has not selected the card, then method 400 proceeds to 412 and the computing system determines whether a secondary presentation period associated with the currently displayed card has expired. If the secondary presentation period has not expired, then method 400 returns to 410.

However, if the secondary presentation period has expired, the method 400 returns to 402 and the computing system presents the next card of the newscast. In such fashion, the computing system can autoplay a newscast that includes a plurality of cards, thereby providing a lean-back, interactive experience that enables a user to browse and understand content items (e.g., news articles or reactions) that provide different perspectives around a topic (e.g., a news story).

Although not shown in FIG. 4, a user can also navigate between cards. The computing device can navigate to a new card (e.g., next card or previous card) based on user input and, once the new card is presented, start at step 404 with respect to such new card.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 3 and 4 respectively depict steps performed in a particular order for purposes of illustration and discussion, the methods of the present disclosure are not limited to the particularly illustrated order or arrangement. The various steps of the methods 300 and 400 can be omitted, rearranged, combined, and/or adapted in various ways without deviating from the scope of the present disclosure.

What is claimed is:

1. A computer-implemented method to provide an informational display, the method comprising:
    identifying, by one or more computing devices, a plurality of content items;
    obtaining, by the one or more computing devices, a plurality of cards respectively for the plurality of content items; and
    providing for display, by the one or more computing devices, a user interface that automatically cycles through the plurality of cards respectively associated with the plurality of content items such that each of the plurality of cards is presented for a respective predefined presentation period;
    wherein the user interface comprises a progress bar that comprises a plurality of graphically disconnected segments that respectively correspond to the plurality of cards, wherein a respective gap is formed between each adjacent pair of graphically disconnected segments, and wherein, for each of the plurality of cards, the respective disconnected segment that corresponds to such card progressively fills during presentation of such card until the respective predefined presentation period for such card expires; and
    wherein, during presentation of each card, the plurality of graphically disconnected segments are superimposed over the card and a portion of the card is displayed in each gap between the plurality of graphically disconnected segments.

2. The computer-implemented method of claim 1, further comprising:
    receiving, by one or more computing devices, input descriptive of a search associated with a topic; and
    wherein the plurality of content items are associated with the topic.

3. The computer-implemented method of claim 1, wherein the plurality of content items are associated with a topic, and wherein the plurality of content items comprise content items of a plurality of perspectives.

4. The computer-implemented method of claim 1, wherein the plurality of content items are associated with a topic, and wherein the plurality of cards are interactive such that selection of at least one of the cards of the plurality of cards provides an option to visit a larger landing page associated with the topic.

5. The computer-implemented method of claim 4, further comprising:
receiving, by the one or more computing devices, a card selection of one of the plurality of cards, wherein the card selection is completed by a user; and
in response to receiving the card selection, providing, by the one or more computing devices, the option to visit the larger landing page associated with the topic.

6. The computer-implemented method of claim 1, wherein the user interface comprises a control widget that enables a user to initiate an audio-based portion of the user interface.

7. The computer-implemented method of claim 1, wherein the plurality of content items comprise at least one of an article, a blog, a textual comment, a video, or an audio clip.

8. The computer-implemented method of claim 1, wherein the user interface comprises a content feed, and wherein the content feed comprises the plurality of graphically disconnected segments and the plurality of cards.

9. The computer-implemented method of claim 1, further comprising:
determining, by the one or more computing devices, the plurality of content items exceed a threshold number; and
wherein the plurality of cards are obtained in response to determining the plurality of content items exceed the threshold number.

10. A computing system, comprising:
one or more computing devices; and
one or more non-transitory computer-readable media that collectively store instructions that, when executed by the one or more computing devices, cause the one or more computing devices to perform operations, the operations comprising:
receiving input descriptive of a search associated with a topic;
obtaining a plurality of content items associated with the topic;
obtaining a plurality of cards respectively for the plurality of content items; and
providing for display a user interface that automatically cycles through the plurality of cards respectively associated with the plurality of content items such that each of the plurality of cards is presented for a respective predefined presentation period; and
wherein the user interface comprises a progress bar that comprises a plurality of graphically disconnected segments that respectively correspond to the plurality of cards, wherein a respective gap is formed between each adjacent pair of graphically disconnected segments, and wherein, for each of the plurality of cards, the respective disconnected segment that corresponds to such card progressively fills during presentation of such card until the respective predefined presentation period for such card expires.

11. The computing system of claim 10, wherein during presentation of each card, the plurality of graphically disconnected segments are superimposed over the card and a portion of the card is displayed in each gap between the plurality of graphically disconnected segments.

12. The computing system of claim 10, wherein the operations further comprise:
providing a plurality of search results based on the input; and
wherein the user interface is provided as a search result of the plurality of search results.

13. The computing system of claim 10, wherein the plurality of content items comprise content items from a plurality of sources.

14. The computing system of claim 10, wherein the user interface comprises a fast forward icon for increasing play speed.

15. The computing system of claim 10, wherein the operations further comprise:
receiving a tap input to navigate the plurality of cards; and
navigating to a different card of the plurality of cards based on the tap input.

16. One or more non-transitory computer-readable media that collectively store instructions that, when executed by one or more computing devices, cause the one or more computing devices to perform operations, the operations comprising:
identifying a plurality of content items;
obtaining a plurality of cards respectively for the plurality of content items; and
providing for display a user interface that automatically cycles through the plurality of cards respectively associated with the plurality of content items such that each of the plurality of cards is presented for a respective predefined presentation period;
wherein the user interface comprises a progress bar that comprises a plurality of graphically disconnected segments that respectively correspond to the plurality of cards, wherein a respective gap is formed between each adjacent pair of graphically disconnected segments, and wherein, for each of the plurality of cards, the respective disconnected segment that corresponds to such card progressively fills during presentation of such card until the respective predefined presentation period for such card expires; and
wherein, during presentation of each card, the plurality of graphically disconnected segments are superimposed over the card and a portion of the card is displayed in each gap between the plurality of graphically disconnected segments.

17. The one or more non-transitory computer-readable media of claim 16, wherein the operations further comprise:
receiving a selection of one of the plurality of cards, wherein the selection is completed by a user; and
in response to receiving the selection, redirecting the user to a content item that corresponds to the selected card.

18. The one or more non-transitory computer-readable media of claim 16, wherein the operations further comprise:
obtaining a plurality of content descriptors, wherein each content descriptor is associated with a respective content item of the plurality of content items; and
providing the plurality of content descriptors for display, wherein each content descriptor is displayed with a respective card based on the respective content item associated with the content descriptor.

19. The one or more non-transitory computer-readable media of claim 16, wherein the operations further comprising:
- receiving, by one or more computing devices, input descriptive of a search associated with a topic; and
- wherein the plurality of content items are associated with the topic.

20. The one or more non-transitory computer-readable media of claim 16, wherein:
- at least one card of the plurality of cards comprises dynamic imagery; and
- providing for display, by the one or more computing devices, the user interface that automatically cycles through the plurality of cards comprises, for the at least one of the plurality of cards, providing for display, by the one or more computing devices, the dynamic imagery during the respective predefined presentation period for the at least one card.

* * * * *